United States Patent [19]
Kremer

[11] 3,784,842
[45] Jan. 8, 1974

[54] BODY CURRENT ACTIVATED CIRCUIT BREAKER

[76] Inventor: Frederic B. Kremer, 1600 Garrett Rd., Apt. B204, Upper Darby, Pa. 19082

[22] Filed: Dec. 11, 1972

[21] Appl. No.: 314,162

Related U.S. Application Data

[63] Continuation-in-part of Ser. No. 223,096, Feb. 3, 1972, Pat. No. 3,706,008.

[52] U.S. Cl. .................. 307/92, 340/279, 317/18 A
[51] Int. Cl. ............................................ H02h 3/16
[58] Field of Search ...................... 317/18 B, 18 A; 200/DIG. 2; 340/279; 128/2 R, 2 E, 2 N, 2.1 R; 307/92, 93, 131, 143

[56] References Cited
UNITED STATES PATENTS

| | | | |
|---|---|---|---|
| 3,706,008 | 12/1972 | Kremer | 317/18 A |
| 3,351,813 | 11/1967 | Trout | 317/18 A |
| 3,171,062 | 2/1965 | Rowe, Jr. | 317/18 A |
| 3,697,808 | 10/1972 | Lee | 317/18 A |

*Primary Examiner*—Herman J. Hohauser
*Attorney*—Karl L. Spivak

[57] ABSTRACT

A body current activated circuit breaker responsive to the blow of current through the human body including at least one body encircling sensor to monitor the flow of electrical current in a human being. A circuit breaker is interposed between the source of electrical power supply and an electrical appliance being operated by the human being which causes the current flow, the circuit breaker being responsive to the flow of electrical current monitored by the sensor to automatically and rapidly interrupt the current supply to the electrical appliance upon detecting current flow through the body that exceeds a predetermined, safe level.

9 Claims, 10 Drawing Figures

PATENTED JAN 8 1974

BODY CURRENT ACTIVATED CIRCUIT BREAKER

BACKGROUND OF THE INVENTION

This is a continuation-in-part of my copending U.S. Pat. application Ser. No. 223,096 filed Feb. 3, 1972 now U.S. Pat. No. 3,706,008 entitled "Body Current Activated Circuit Breaker."

The present invention relates generally to the field of electrical interrupting devices, and more particularly is directed to a circuit breaker type of apparatus which is responsive to the undesired flow of current in a human body to automatically interrupt the power supply to an electrical appliance which is responsible for the flow of current.

It is well known that electricity and the effects of electrical current passing through the body causes many deaths and injuries throughout the world. For example, the Statistical Abstract of the United States, 1970 edition lists the number of accidental deaths in the United States caused by electrical current for the years 1960, 1965 and 1967 as 989, 1,071 and 992 deaths respectively.

Various effects of electrical current upon the human body have been noted by prior workers in the field. Electrical current, for example, has been known to temporarily or permanently cause breathing to stop. Permanent or temporary damage to the nervous system has been known to occur. Cardiac arrest is possible. Burns throughout the entire range from minor to fatal are readily documented. Ventricular fibrillation, a condition where the heart simply vibrates and loses its normal pumping action, may occur. Under such circumstances death usually occurs within a period of approximately 4 minutes. Inasmuch as defibrillators are rarely available at the scene of an accident, ventricular fibrillation is almost always fatal and it is believed to be the most common cause of death due to electrical shock.

It has been observed that damage to the human body is caused by the flow of current and that such damage is not actually a function of the voltage. When an electrical current passes through a body, it produces a corresponding voltage. Because the resistance of the body to the flow of electrical current varies, the voltage also will correspondingly vary and so, the same current will not always produce exactly the same voltage. In any event, a dangerous rise in the flow of current will also cause an increase in the ambient voltage. Small electrical currents are always present in living bodies due to the functions of the body and in some instances, due to radiation from outside sources.

Dalziel, in a paper entitled, "Reevaluation of Lethal Electric Currents," IEEE Transactions on Industry and General Applications, Vol. IGA-4, No. 5, September/October, 1963, has approximated the level at which current is considered to be dangerous at 16 ma for men and 10.5 ma for women. He refers to these as "let-go" currents because currents above this level tend to freeze the victim's muscles so that he cannot let go of the source of the current. Kouwenhoven supports these findings in a paper entitled "AC Shocks of Varying Parameters Affecting the Heart," Communications and Electronics, May, 1959 where he states that the limit of safe current is 15 ma.

When dealing with electric shocks, time is of the utmost importance. In general, the proposition that a shock of short duration is less dangerous then a shock of the same magnitude of longer duration was substantiated by L. P. Ferris, "Effects of Electric Shock On The Heart," Electrical Engineering, May, 1936. Kouwenhoven's research illustrates specific levels and durations. Dalziel has formulated an "electrocution equation" which further illustrates this time-death relationship. See "Lethal Electric Currents," IEEE Spectrum, February, 1969. The magnitude of the shock must be within certain limits for each duration. FIG. 2, shows a graph derived by Dalziel which illustrates this relationship. The portion above and to the right of the electrocution threshold for adults is the most dangerous region. The area below the "let go threshold" is considered safe. An operative body current activated circuit breaker should interrupt current at the lowest detectable level and should do so as soon as possible. Present technology allows detection as the current approaches 3 milliampere level and switching times on the order of one hundred microseconds for typical 60 Hz shocks.

SUMMARY OF THE INVENTION

The present invention relates generally to the field of safety devices in the electrical art, and more particularly is concerned with a circuit breaker which is interposed between an electrical appliance and its user to automatically interrupt the current supply to the appliance immediately upon the detection of an increase in current in the body of the user that is caused by the appliance.

A circuit breaker device is provided with an outlet to supply line voltage to an electrical appliance such as a hand power tool, electrical testing gear, electrical medical treatment devices, industrial machines, electrically operated amusement devices and the like. A current detecting toroidal coil capable of sensing an increase in body current connects to the circuit breaker and is placed remotely upon the body of the user for example, around each of the user's arms. This detection technique was chosen because it eliminates the need for electrical contacts with the body and is relatively free from electrostatic pick up problems. It is also primarily current sensitive. Since the great majority of shock hazard situations involve at least one arm as a current pathway to the heart, the arms were chosen for the application of the sensing devices. In special applications, other sensor locations may be used such as the legs or the neck.

The start of a current flow in any limb with a surrounding toroid coil induces a voltage in the coil. The induced voltage is amplified and applied to the input of a comparator. If the magnitude exceeds a preset level, the comparator triggers the circuit interrupter. An "OR" circuit makes it possible for any or all toroid sensors used to cause interruption of the energy source. The device is provided with internal circuitry capable of immediately interrupting the flow of current to the electrical appliance in response to the detection of increased body current by either of the toroidal coils above a predetermined level. Should the voltage across the toroidal coils exceed the predetermined level, the comparator circuit within the circuit breaker will note it and send a signal to the interruptor. When the interruptor actuates, it opens both leads to the line voltage, thereby interrupting the power supply to the electrical appliance and the device's circuitry, and holds that position until manually re-set. If desired, the line voltage may be transformed and applied to an alerting light and a buzzer to give visual and audible warning signals.

It is an object of this invention to provide a novel body current activated circuit breaker of the type set forth.

It is another object of this invention to provide a novel body current activated circuit breaker capable of automatically and immediately interrupting the flow of current to an electrical appliance upon the detection of an increase in voltage across a body.

It is another object of the present invention to provide an improved body current activated circuit breaker that includes a body encircling toroidal coil and necessary circuitry to interrupt the flow of electrical current to an electrical appliance automatically when the coil detects an increase in the current in the body of the user.

It is another object of the present invention to provide a novel body current activated circuit breaker that is electrically interposed between an electrical appliance and its user and which is capable of interrupting the source of power to the electrical appliance should an increase in user body current be detected to prevent the danger of fatal shock to the user.

It is another object of the present invention to provide a novel body current activated circuit breaker that is inexpensive in manufacture, rugged in construction and trouble free when in use.

Other objects and a fuller understanding of the invention will be had by referring to the following description and claims thereof, taken in conjunction with the accompanying drawings wherein like reference characters refer to similar parts throughout the several views and in which:

DESCRIPTION OF THE PREFERRED EMBODIMENTS OF THE INVENTION

Figure 1:
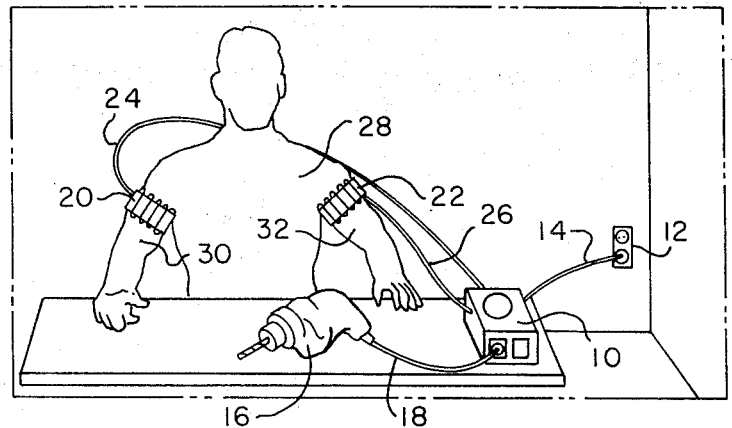
FIG. 1 is a perspective view of the device in use in conjunction with an electrical appliance such as a hand power drill.

Although specific terms are used in the following description for the sake of clarity, these terms are intended to refer only to the particular structure of my invention selected for illustration in the drawings, and are not intended to limit or define the scope of the invention.

Referring now to the drawings, I show in FIG. 1 a circuit breaker device 10 connected to a source of electrical power, for example, a common duplex wall receptable 12 through conventional two cord power supply line 14, which preferably is grounded in accordance with the latest appliance grounding techniques. An electrical appliance, for example a hand power drill 16, connects to the circuit breaker 10 through its two wire power supply cord 18 in the usual manner. The power supply line 18 should preferably also include a conventional ground wire (not shown). Extending from the circuit breaker device 10 are a pair of body member encircling toroidal coils 20, 22 which are wired to the device 10 by their respective two wire conductors 24, 26. It will be understood that all of the wiring connections are well insulated in the usual manner to comply with all safety regulations, such as the National Electrical Code and the requirements of Underwriters' Laboratories, Inc. In addition to the wiring connections illustrated, third wires for grounding purposes may be employed in well known manner without interfering with the basic circuitry and operation of the device. The toroidal coils 20, 22 encircle remote positions of the body of the user 28, for example, the upper arms 30, 32 for the body voltage monitoring purposes. Conductor means for transmitting a current flow signal from the sensors 20, 22 (FIG. 1) and 174 (FIG. 10) may be conventional wires 24, 26 or a radio transmitted signal (not shown).

Figure 3:
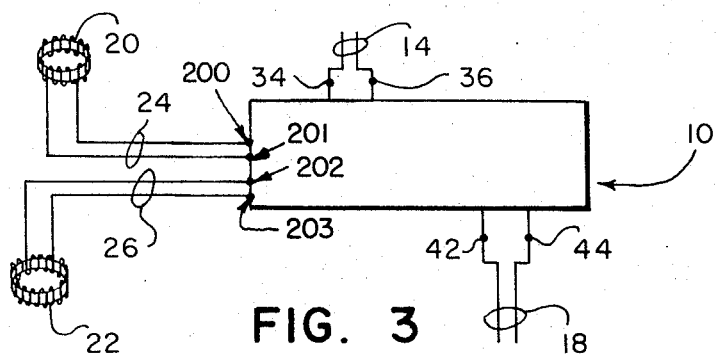
FIG. 3 is a general block diagram showing the normal electrical connections to the body current actuated circuit breaker of the present invention.
Figure 4:
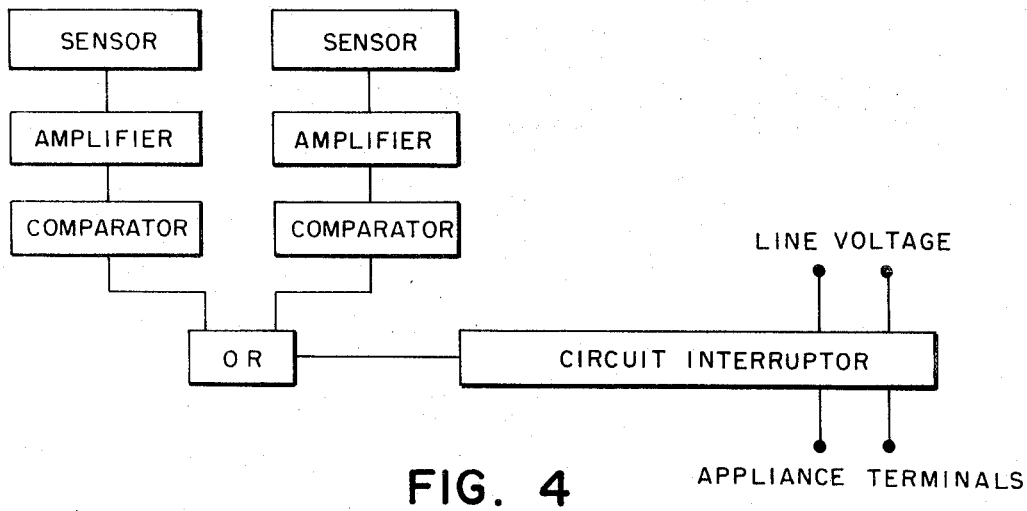
FIG. 4 is a circuit equivalent block diagram showing the interrelation of the operating parts of the device.

As simply illustrated in FIG. 3, the two cord power supply 14 introduces line current to the circuit breaker 10 at the upper terminals 34, 36. The toroidal coil conductors 24, 26 connect to the circuit breaker device 10 at the terminals 200, 201, 202, 203. Similarly, the appliance power supply cord 18 connects to the circuit breaker device 10 at the lower terminals 42, 44.

Figure 5:
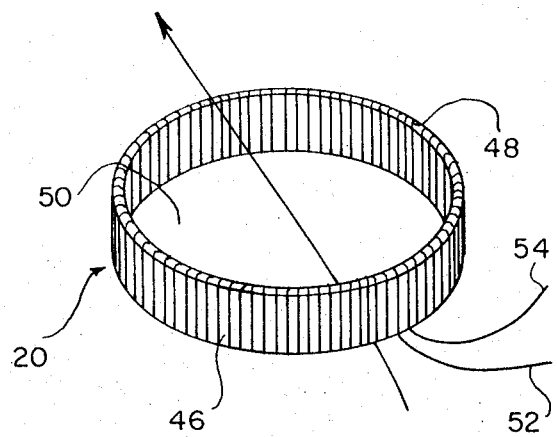
FIG. 5 is an enlarged perspective view of a toroidal coil used in encircling a portion of the body of the user.

Referring to FIG. 5, I show a toroidal coil 20, or 22 which acts as a current sensor when applied about the arms or legs of the appliance user 28. In accordance with well known toroidal coil construction technology, a continuous wire 48 is wrapped around a soft iron (or one of several other materials) annular core 46 to detect and measure the change in flow of current. Current flowing through the central opening 50, such as encountered when current flows through the arms or legs of the user, will induce a magnetic field in the core 46. The magnetic field of the core will be perpendicular to the wire wrapped around it and will induce a flow of current through the wrapped wire 48.

When used with the body current activated circuit breaker 10, a person's arm will insert through the center opening 50 of the toroid. Typically, if a current which is approaching a dangerous level is flowing through the arm 30, 32 a voltage will be produced in the wrapped wire between the wrapped wire ends 52, 54.

Note, there is no need for any contact between the toroidal coil 20, 22 and the skin of the user 28. It could actually be worn on top of a shirt if so desired.

This is an improvement over the electrode employed in my said co-pending application because the previous approach did require body contact. Aside from being an inconvenience, body contact is unfavorable because of the variance in contact resistance which would occur.

It is necessary to reconsider the mode of operation. One application of the new approach, involves the use of one toroid worn on each arm 30, 32. Then, a body current which flows through either one arm or both arms will be detected either by one toroidal coil sensor 20 or by two toroidal coil sensors 20, 22 respectively. It is of interest to note that practically all fatal shocks (most of which have a pathway through the heart) involve a pathway through one arm and one leg or both arms. Therefore, at least one of the two sensors positioned as in FIG. 1 would detect the fatal current in most instances.

Figure 2:
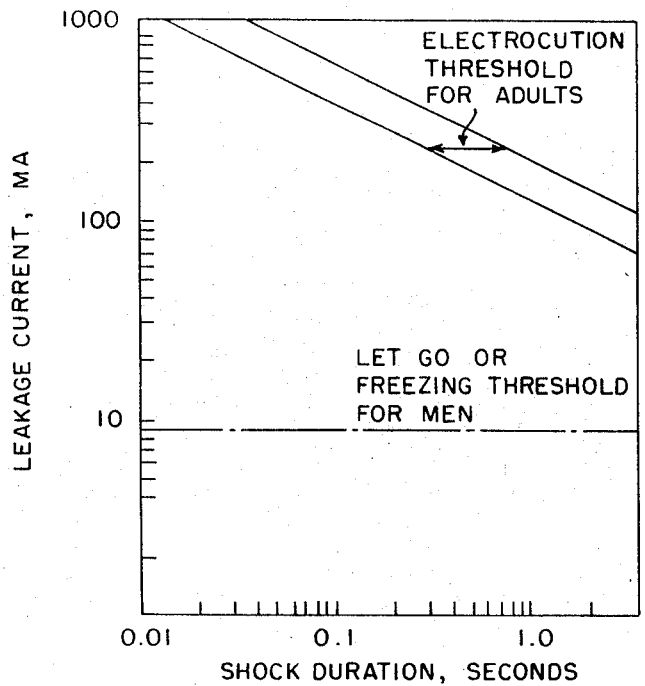
FIG. 2 is a graph derived by Dalziel illustrating the relationship between magnitude of a shock and its duration as affecting the human body.

In order to test this approach, an experimental model of a circuit breaker device 10 using only one toroidal coil sensor 20, 22 was constructed. The circuitry is designed so as to allow the voltage at which the comparator switches to be adjustable. In combination with the toroidal coil sensor used, this determines what magnitude and frequency current pulse causes the circuit breaker device 10 to switch. This was adjusted so that in a worst case, a 60Hz current triggers the system as it approaches no greater than 3 ma. (Most shocks will induce switching at a lower current level.) When considered with the electrocution curve in FIG. 2, this magnitude is very favorable.

Figure 6:
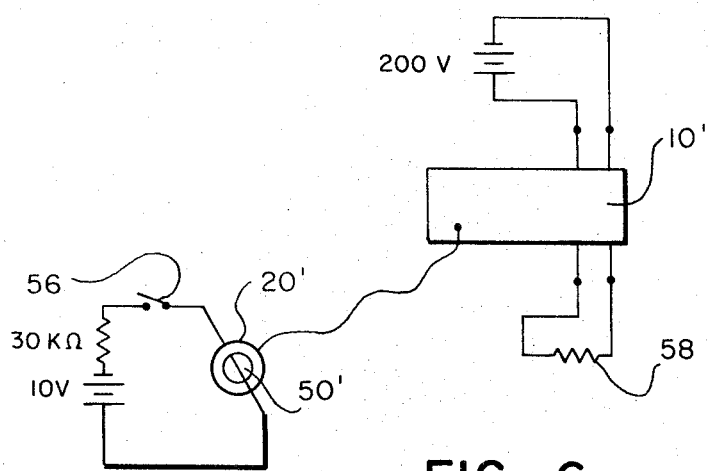
FIG. 6 is a schematic diagram illustrating a test set up.

In order to test the switching time of the prototype, the test set up shown in FIG. 6 was arranged. When switch 56 was open, circuit breaker device 10' allowed 200 VDC to be applied to the load 58 which was a 400 ohm resistor. When the switch 56 was closed, current through the center 50' of the sensor 20' rose to an alarm value. The circuit breaker device 10' sensed this and interrupted the current to the resistor 58. A DC line voltage (200v) was used for two reasons. First, it allowed for a worst case comparison of an AC line voltage with an equivalent peak magnitude. Second, a consistent time measurement could be made.

Figure 7:
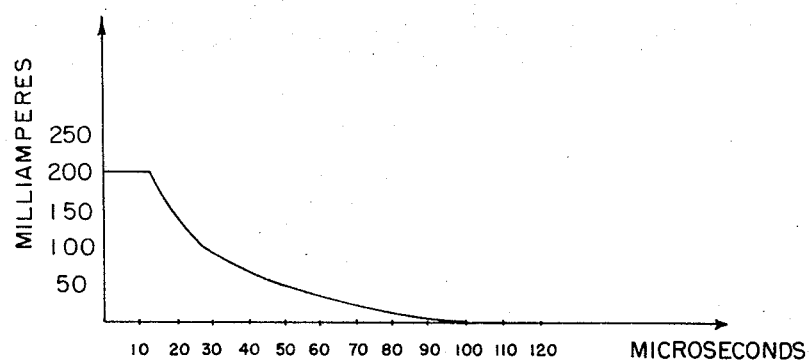
FIG. 7 is a graph illustrating the results obtained by utilizing the test set up of FIG. 6.

FIG. 7 shows the voltage across the resistor 58 plotted against time with the onset of the alarm situation at $t=0$. After 80 microseconds, the current dropped to 10 percent of its original value or to twenty milliamps, while after one hundred microseconds, the current was virtually zero. The ability of the prototype circuit breaker device 10' to limit the current this quickly indicated that it will keep typical shocks well on the safe side of the electrocution curve in FIG. 2.

The experimental model 10' was tested with live animals to verify experimentally that the circuit breaker device protects live subjects from electric shocks that would otherwise cause ventricular fibrillation, and resultant death.

The general procedure involved three parts. First, without using the circuit breaker device 10', a level and duration of current was established that caused fibrillation a certain percentage of the time in a particular animal. Second, with the circuit breaker device protecting the aminals, the same shock type was applied many times. Third, the circuit breaker device was taken out and the shock was repeated.

Figure 8:
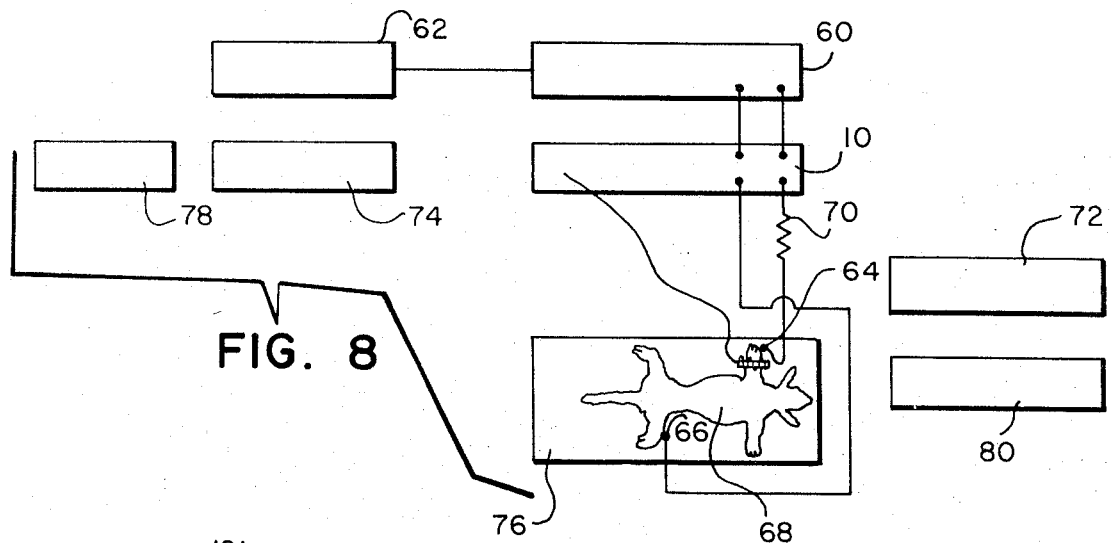
FIG. 8 is a diagrammatic representation of an experimental system employed for test with live animals.

The equipment was arranged as shown in FIG. 8. The voltage source was supplied by a variac and a 4:1 step up transformer. This provided an adjustable 60Hz voltage which was connected in series with a triac, which was gated by the timer 62. The voltage source 60 was connected to the circuit breaker device 10. The circuit breaker device in turn provided voltage to two shock delivering electrodes 64, 66. Each electrode was metallic, $1'' \times 1\frac{1}{4}'' \times 1/32''$ (typical EKG electrodes). The electrodes were on gauze pads which were soaked with a saturated solution of sodium chloride. One was placed on the right foreleg and the other on the left hind leg of an animal, such as a dog 68. There was a current measuring one ohm resistor 70 in series with the dog. Voltage across it was monitored with a Tektronix No. 564 oscilloscope 72. An AC low power defibrillator 74 was used. Healthy mongrel dogs 68 of mean weight, 25 pounds were anesthetized with intravenous pentobarbital (30mg/kg) and titrated to effect with intermittent injections. A syringe with a No. 21 needle remained in the vein filled and clamped with 1 percent heparinized saline. The anterior chest and the dorsal surfaces of the right front paw and left rear paw of the dog 68 were shaved and the animal immobilized on a wooden V-shaped board 76. Constant EKG monitoring was accomplished with a modified Hewlett Packard electrocardiograph 78 capable of quick recovery from defibrillating shock effects. An endotracheal tube (not shown) was inserted and inflated and positive pressure breathing was accomplished using a Harvard respirator 80 set to 20 breaths/minute.

The testing was started with the current sensing part of the circuit breaker device 10 deactivated. This was done by turning off the amplifier that follows the sensor. The voltage source and timer were set to give a shock of particular magnitude and duration. After the shock was applied, the occurence or lack of occurence of fibrillation was noted on the EKG 78. The current magnitude and duration were recorded. If fibrillation did not occur, attempts continued. When fibrillation occurred, the defibrillator electrodes were applied to the chest and the defibrillator was activated. After defibrillation, at least 3 minutes were allowed before the next shock was applied. A total of approximately five fibrillation attempts were made. The current sensor on the circuit breaker device was then activated by turning the amplifier on. The same shock was delivered. The presence of a normal heart beat was noted on the EKG 78. The circuit breaker device 10 was reset and the test was repeated many times. Then, the sensor was again deactivated and approximately five additional fibrillation attempts were administered. The total number of fibrillation-defibrillation sequences for the anesthetized dog did not exceed 15.

The following Table I shows the result of the three sets of tests. The "approximate possible shock" describes the type of current that is delivered to the circuit breaker device. When the sensor is "off," this is actually the shock delivered to the dog. When the sensor is "on" it is the potential shock that the circuit breaker device is preventing. The columns labelled "without BAB" refer to the shocks delivered when the current sensor is "off." "With BAB" means the current sensor was "on."

Test set one considers a shock that causes fibrillation 50 percent of the time when the dog is not protected. When the circuit breaker device is used, 100 attempts produced no fibrillations. Test sets two and three show similar results. No fibrillations occurred when the circuit breaker device was used. These two sets considered shocks which normally caused fibrillation 66.7 percent of the time. Test set 4 shows 105 successful interruptions for a type of shock that causes fibrillation 70 percent of the time. Available equipment was not sensitive enough to measure accurately the small alarm pulse that the dogs received. It was noted when the circuit breaker device was used that the dogs showed no visible response to the shock.

This experiment indicated that the circuit breaker device protects its user from a typical hazard of electric shocks, thus illustrating its importance as a new safety device. The types of shocks tested were used as a first practical test for the device. The circuit breaker device will be effective against many other types of shocks. The circuit breaker device incorporates means to rapidly interrupt the flow of line current and as illustrated in FIG. 7, the circuit breaker device 10 initiates its interrupting action within approximately twenty microseconds after detection of the flow of current in the body of the user 28 and completely interrupts the line current after a period of approximately one hundred microseconds. The current interrupting means incorporate the amplifier 82, the comparator 84 and the interruptor 86 as more fully discussed in the description of FIG. 9

TABLE 1

| Test | Approximate possible shock | | Without BAB | | | | | | With BAB, Total | |
|---|---|---|---|---|---|---|---|---|---|---|
| | | | Initial | | Final | | Total | | | |
| | Duration | Magnitude | Attempts | Fibs | Attempts | Fibs | Attempts | Fibs | Attempts | Fibs |
| 1 | 1.1 | 0.45 | 5 | 2 | 5 | 3 | 10 | 5 | 100 | 0 |
| 2 | 0.8 | 0.2 | 5 | 3 | 4 | 3 | 9 | 6 | 47 | 0 |
| 3 | 0.8 | 0.18 | 7 | 4 | 2 | 2 | 9 | 6 | 54 | 0 |
| 4 | 0.75 | 0.18 | 6 | 3 | 4 | 4 | 10 | 7 | 105 | 0 |

Figure 9:
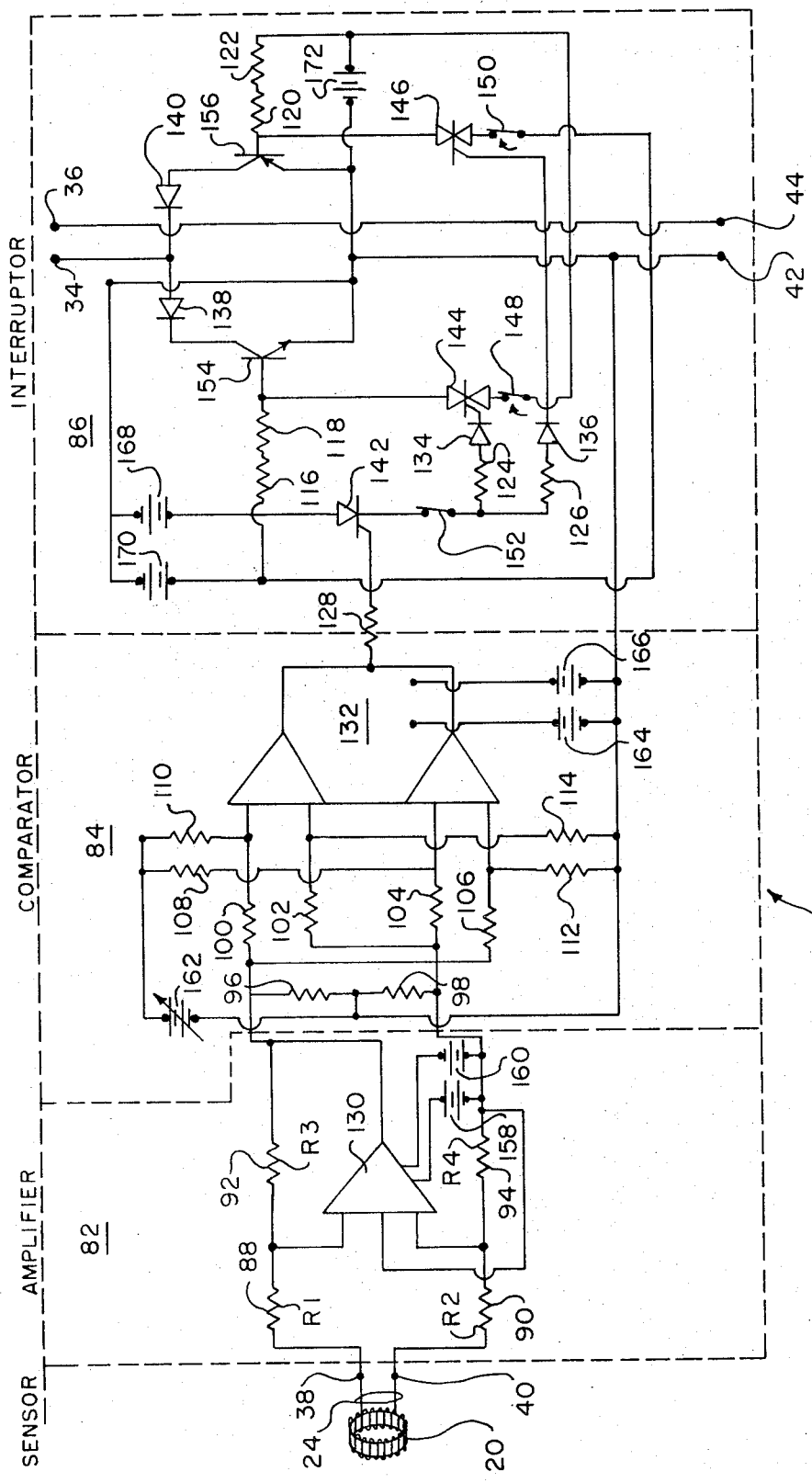
FIG. 9 is a schematic wiring diagram of an experimental body current activated circuit breaker which was tested with live animals.

Referring now to FIG. 9, I show a suggested schematic wiring diagram of the circuit breaker device 10. The equipment consists primarily of a toroidal coil sensor 20 which is connected to the amplifier section 82 through the conductors 24. The amplifier circuit is of the differential input type which may be similar to the differential input type amplifier available through Burr-Brown, Inc. The amplifier section 82 amplifies the voltage received at the input terminals to one thousand times its original magnitude and feeds the amplified voltage to the comparator section 84. The comparator section 84 notes an alarm condition in the system and sends this signal to the interruptor section 86. The interruptor section acts to interrupt the flow of line current which is received at the upper terminals 34, 36 to prevent line current from reaching the lower, appliance terminals 42, 44.

The following table lists the values of components set forth in the circuit of FIG. 9:

| Component | Reference Numeral | Value |
|---|---|---|
| resistor | 88 | 820 ohms |
| resistor | 90 | 820 ohms |
| resistor | 92 | 82k ohms |
| resistor | 94 | 82k ohms |
| resistor | 96 | 100 ohms |
| resistor | 98 | 100 ohms |
| resistor | 100 | 20 ohms |
| resistor | 102 | 20 ohms |
| resistor | 104 | 20 ohms |
| resistor | 106 | 20 ohms |
| resistor | 108 | 12k ohms |
| resistor | 110 | 12k ohms |
| resistor | 112 | 12k ohms |
| resistor | 114 | 12k ohms |
| resistor | 116 | 22 ohms |
| resistor | 118 | 22 ohms |
| resistor | 120 | 22 ohms |
| resistor | 122 | 22 ohms |
| resistor | 124 | 68 ohms |
| resistor | 126 | 68 ohms |
| resistor | 128 | 1k ohms |
| power supply V-1 | 158 | 15 volts |
| power supply V-2 | 160 | 15 volts |
| power supply V-3 | 162 | 0-50 volts |
| power supply V-4 | 164 | 12 volts |
| power supply V-5 | 166 | 6 volts |
| power supply V-6 | 168 | 6 volts |
| power supply V-7 | 170 | 3 volts |
| power supply V-8 | 172 | 3 volts |

In the circuit of FIG. 9, the toroidal coil current sensors 20 or 22 act as current transformers. If a current pulse is sent through the upper arm 30, 32 of the user 28, this pulse would pass through the central opening 50 to thereby induce a voltage in the core wound wire 48 which would be impressed at the output wire ends 52, 54. The induced voltage is applied to the amplifier 82 at the input terminals 38, 40 thereof. The amplifier circuit is a differential input type, suggested by Burr-Brown, Inc. and acts to amplify the input voltage to one thousand times its original magnitude. The amplifier circuit utilizes an operational amplifier which requires + 15v and −15v power supplies 158, 160.

An operational amplifier as manufactured by Fairchild, catalog number 741 has proved satisfactory for this use. The gain through the amplifier section 82 may be calculated from the relation.

$$R3/R1 = R4/R2$$

An alarm situation exists when the current through the sensor 20 or 22 exceeds a predetermined safe level causing the amplified output from the amplifier section 82 to also exceed a predetermined level. The voltage may be of either polarity.

In an alarm situation, the comparator section 84 notes the condition and instantaneously sends a signal to the interruptor section 86. The comparator section 84 utilizes a dual comparator 132, which may be dual comparator catalog number 711 as manufactured by Fairchild which employs +12v and −6v power supplies 164, 166. The dual comparator has the following response curves:

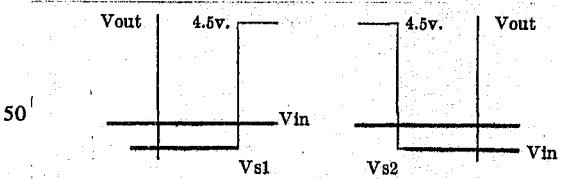

By using the response curves together, the following resultant response curve is obtained.

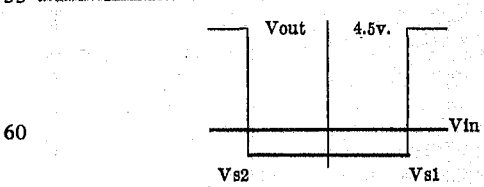

The resistor matrix preceeding the dual comparator 132 provides a differential input, which, in conjunction with the variable power supply 162 establishes the values of Vs1 and Vs2. The resistors 108, 110, 112, 114 serve to bias the dual input to the dual comparator 132.

During normal operation, the line current is conducted through the transistors 154, 156 which each carry one half of each sine wave. The transistor 154 is activated by the positive voltage at its base which is provided by the power supply 170. The transistor 156 is activated by the negative voltage at its base which is provided by the power supply 172. In the circuit illustrated, the transistor 154 is power transistor number 2N5805 and the transistor 156 is power transistor number 2N6213 as manufactured by Motorola and RCA, respectively (and other manufacturers) Triacs 144, 146 are not conducting and are triacs number 40525 as manufactured by RCA.

Under normal conditions, transistor 154 will stay on until its base is driven negative and transistor 156 will stay on until its base is driven positive. In an alarm condition, the +4.5v pulse from the comparator 132 will turn on the normally off silicon control rectifier, 142, which may be part number 2N2322 as manufactured by RCA. The silicon control rectifier 142 in turn activates the triacs 144, 146 which cause the power transistors 154, 156 to turn off, thereby interrupting the line voltage which is introduced through the upper terminals 34, 36. In order to reset the circuit breaker device 10, current must be removed from the central opening 50 of the toroidal coil sensors 20, 22 and the switches 148, 150, 152 must be simultaneously opened and then closed. In the embodiment illustrated, the sensors 20, 22 consist of 600 turns of copper wire 48 wound about a soft iron core 46 such as manufactured by Neshaminy Transformer Company, catalog number AA046 111 54042 4K-2. The diodes 134, 136, 138, 140 may be catalog number 1N4003 as manufactured by International Rectifier (and others).

Figure 10:
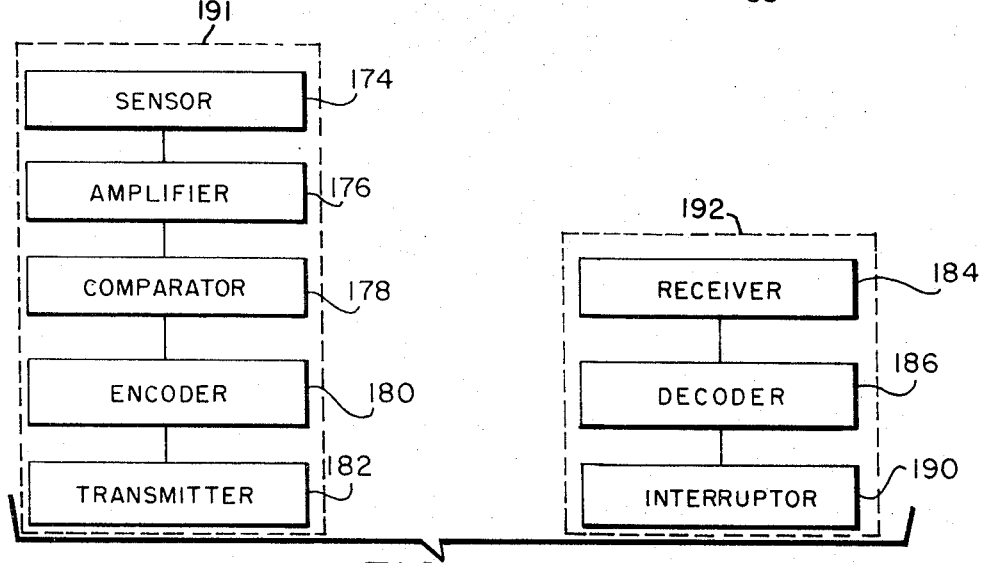
FIG. 10 is a block diagram showing the general arrangement of parts when wireless sensors are used.

Referring now to FIG. 10, I show an alternate type of body current activated circuit breaker which operates without the need for wires going from the user to the circuit breaker. In this type of construction, the signal from the sensor 174 is amplified by the amplifier 176 and fed to a comparator 178. The comparator signal is introduced to a conventional encoder 180 which transforms the signal wave as necessary prior to introduction of the modified signal to a battery powered transmitter 182. The transmitter signal is received by a receiver 184 which introduces its output to a decoder 186. The decoder again modifies the signal received at the reciever 184 and delivers the signal to the interruptor 190 which functions similarly to the interruptor section 86. Many transmitting sensors 191 could be used by many people in conjunction with one receiving interruptor 192. This would allow for protection of, for example, a group of people working in the same laboratory or factory. The power provided for the transmitters may be from rechargeable type batteries.

Other accepted methods of detecting the electromagnetic field produced by a current pulse may be used for different type of current sensors 174, 20, 22. An example of another method detects the field by utilizing the "Hall effect." This involves the placement of a semiconductor chip in a soft iron (or other material) toroid core. If current passes through the center of such a core, the resultant field in the core will produce a change in the "Hall voltage" in the semiconductor. This change in voltage may be used at 200, 201 in FIG. 3.

Although I have described the present invention with reference to the particular embodiments therein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

I claim:

1. In a body current activated circuit breaker which is responsive to the flow of electrical current in a human body caused by the malfunction of an electrical appliance which is activated by line current, the combination of
    A. a circuit breaker device receiving line current and feeding the line current to the electrical appliance,
        1. said circuit breaker device including a line current interruptor which functions from a line current passing position to a line current interrupting position upon receipt of an alarm signal,
        2. the flow of current to the electrical appliance quickly ceasing when the interruptor is functioned to its line current interrupting position;
    B. at least one body current sensing device encircling a portion of the body to detect the flow of electrical current therethrough,
        1. said sensing device including an electromagnetic field sensing device,
        2. said sensing device inducing a voltage upon the passage of current through the encircled portion of the body,
        3. and conductor means to transmit the induced voltage to the circuit breaker device to rapidly deliver an alarm signal to the interruptor.

2. The invention of claim 1 wherein the circuit breaker device includes an amplifier section, said amplifier section receiving the output from the toroidal coil and amplifying the voltage received up to one thousand times its original magnitude.

3. The invention of claim 2 wherein the circuit breaker device further includes a comparator section, the comparator section noting the amplified alarm signal in the system and feeding this signal to the interruptor.

4. The invention of claim 1 wherein the circuit breaker device includes means to initiate action to interrupt the flow of line current within twenty microseconds after current flow in the body has started.

5. The invention of claim 4 wherein the circuit breaker device includes means to completely interrupt the flow of line current to the electrical appliance within a period of 100 microseconds after current flow in the body has started.

6. The invention of claim 3 wherein the sensing device is a toroidal coil.

7. The invention of claim 3 wherein there is no contact between the sensing device and the said body.

8. The invention of claim 6 wherein the conductor means is a pair of wire conductors.

9. The invention of claim 6 wherein the conductor means is a radio transmitted signal.

* * * * *